Patented Nov. 21, 1922.

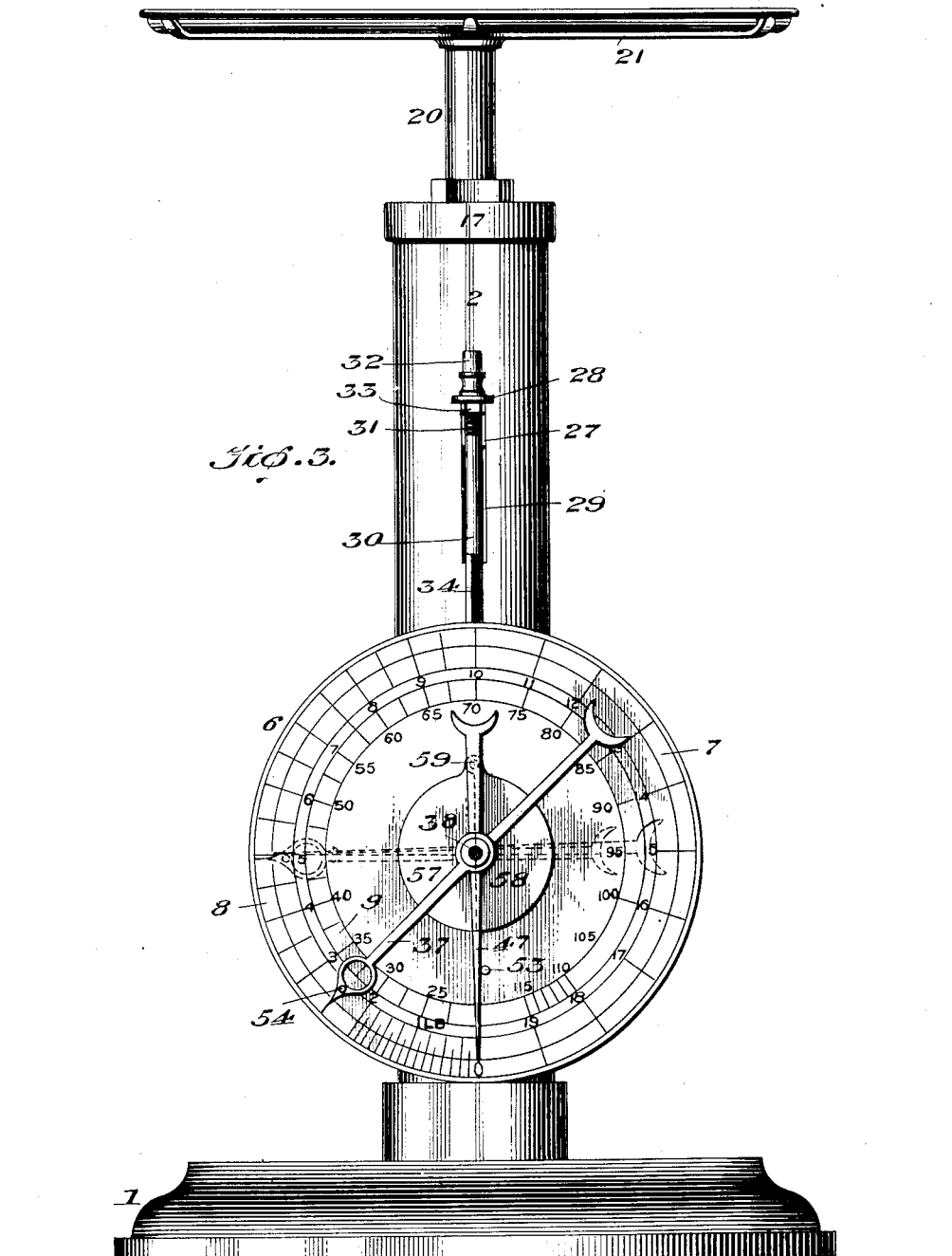
Fig. 3.

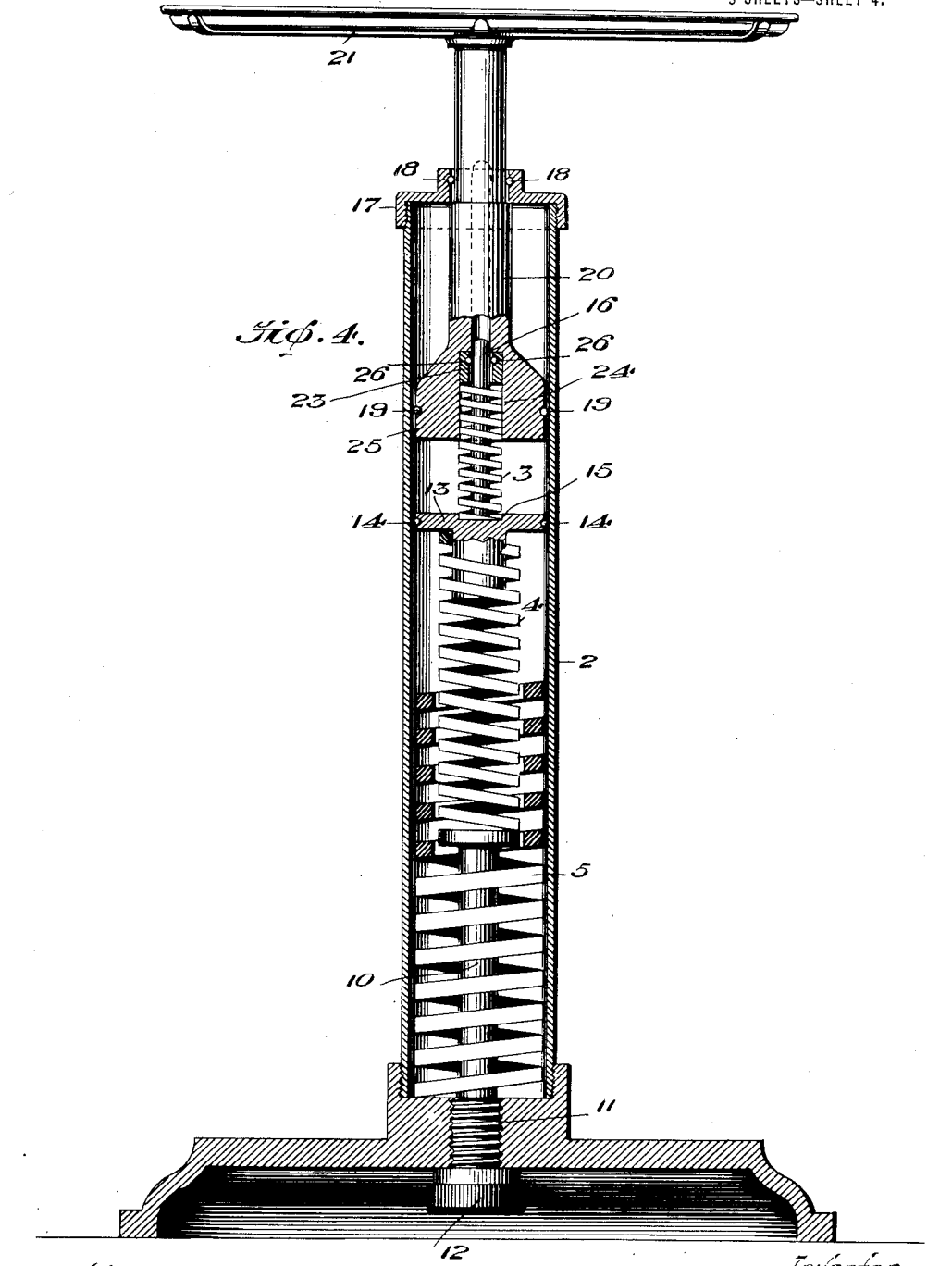

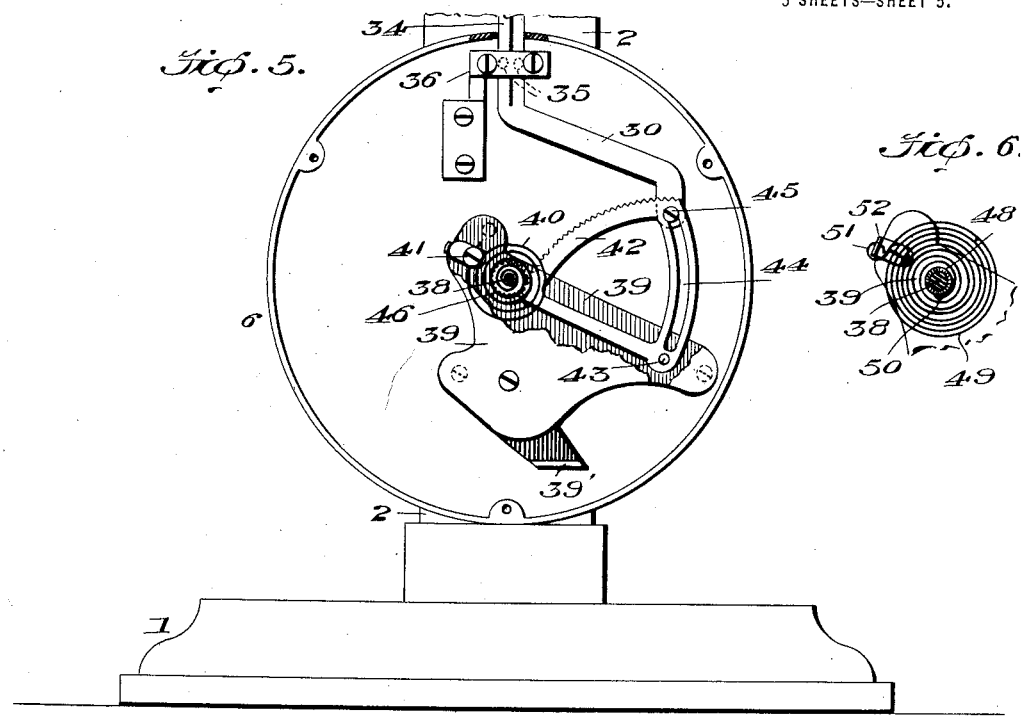
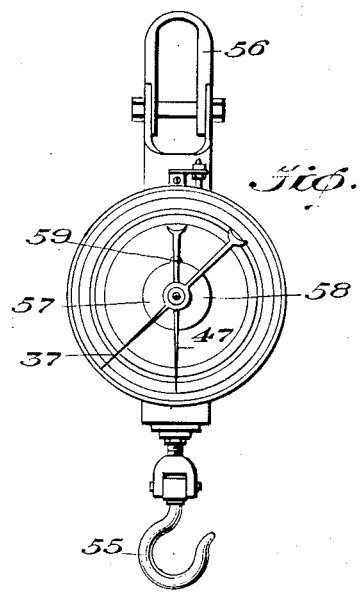

1,436,344

UNITED STATES PATENT OFFICE.

THOMAS FRANCIS HICKEY, OF STILLWATER, NEW YORK, ASSIGNOR OF ONE-HALF TO THOMAS F. HICKEY, OF MECHANICVILLE, NEW YORK.

SPRING SCALE.

Application filed December 9, 1920. Serial No. 429,388.

*To all whom it may concern:*

Be it known that I, THOMAS FRANCIS HICKEY, a citizen of the United States, residing at Stillwater, in the county of Saratoga and State of New York, have invented certain new and useful Improvements in Spring Scales, of which the following is a specification.

This invention, which relates to spring scales, has for its objects the provision of, first, improvements whereby the same scale may be used to weigh objects from one ounce upward into hundreds of pounds; second, a novel arrangement and relationship of a plurality of springs of different tensions adapted to successively assume the weight of the object if the weight exceeds the limit of the weakest one of said springs, whereby objects coming within the first range of weights are sustained by the weakest spring, those coming within the next range of weights are sustained by the next stronger spring, etc.; third, improved means for effecting adjustment so that the primary pointer or indicator may be reset whenever desired to compensate for changes in the springs; fourth, an improved combination of primary and secondary pointers or indicators, the primary pointer indicating on a primary scale up to a certain limit and then being adapted to co-operate with the secondary pointer to carry the latter along a separate set of graduations to indicate greater weights within another range and to visibly indicate the fact that the range of primary scale has been exceeded and that the indication is on the secondary scale; fifth, an improved returning spring for the secondary pointer to insure its return to normal position; sixth, novel operative means interposed between the object-support or supports and pan or pans and the indicating pointers whereby a direct actuation is obtained and compensation is automatically effected, for the travel of the parts so that there will be no false indication at any time, whether the object being weighed is of only one ounce or several hundred pounds avoirdupois; seventh, a spring arranged in a novel manner, for the purpose of preventing jerky action of the primary pointer by insuring constant engagement of the pinion and gear segment which control said pointer; eighth, an improved duplex object-support comprising two pans or platforms, one of which is normally higher than the other and serves for objects of an avoirdupois up to the limits of the capacity of the spring therefor and then transfers the load to the other pan or platform which is supported by springs of greater capacity.

My improvements may be embodied in a scale of the pedestal type, or the suspension type. The respective ranges of graduations for the respective pointers or indicators may vary. By way of illustration, the invention is shown in the drawings and hereinafter described as embodied in a scale wherein the range of weights comprehended by the primary pointer is from zero to twenty and the range comprehended by the secondary pointer is from twenty to one hundred and twenty. It is to be understood, however, that the number of springs and the respective resistances thereof to compression may vary within wide limits as it is possible to carry out my invention in scales which register into tons. Furthermore, various modifications may be resorted to in the embodiment of the essential principles of the invention in operative scales and I do not, therefore, limit myself to the specific recitals in the following description and the disclosures of the accompanying drawings.

In the accompanying drawings:

Fig. 3 is a view like Fig. 1, showing a modification;

Fig. 4 is a vertical section of the modification shown in Fig. 3;

Fig. 5 is a front elevation looking into the shell containing the operating devices, certain parts being broken away;

Fig. 6 is a detail view of the returning spring for the secondary pointer; and

Fig. 7 is a reduced size front elevation of the invention when embodied in a suspension scale.

Figure 1:
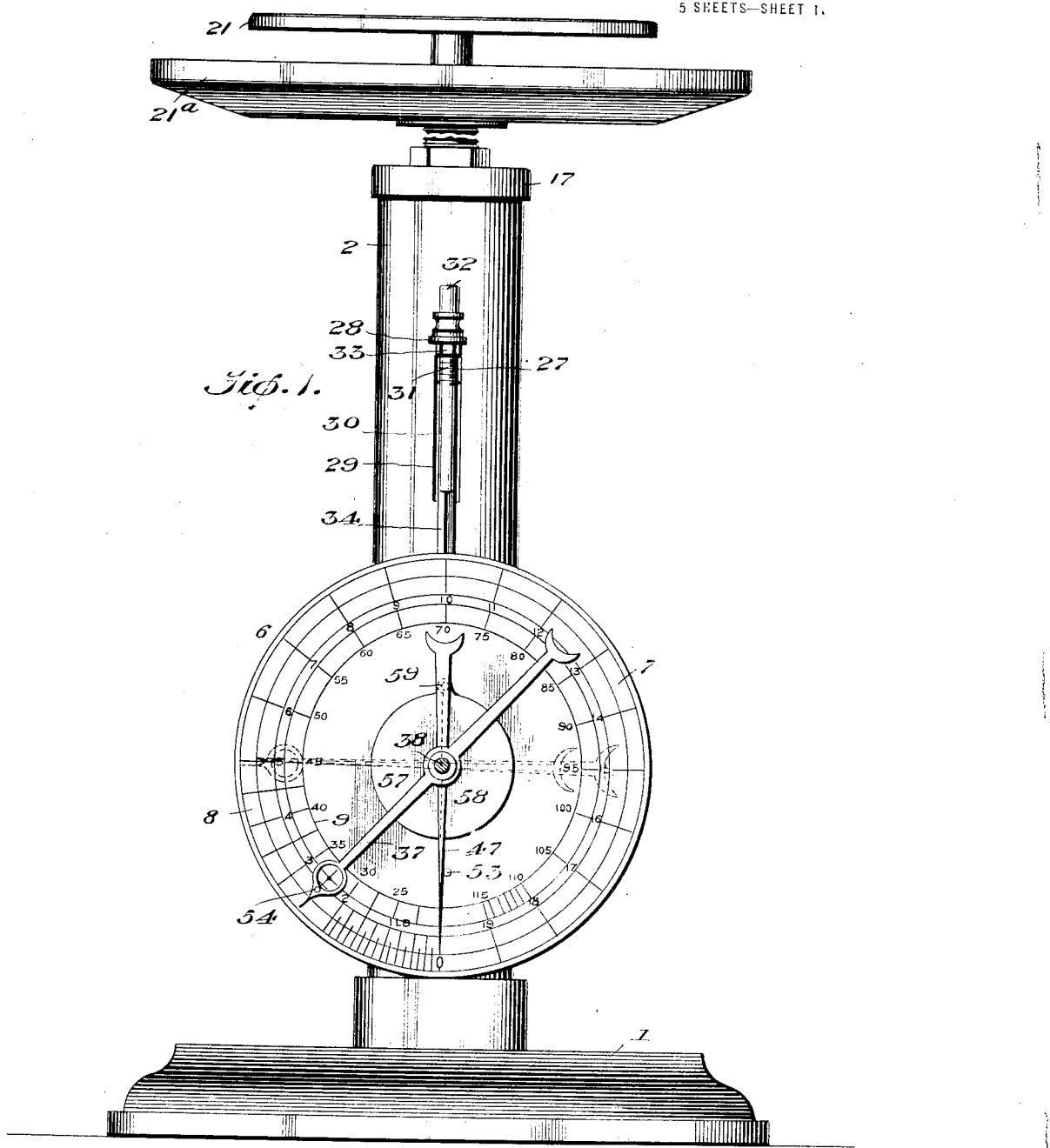
Figure 1 is a side elevation showing one form of the invention, the primary pointer being shown deflected in full lines to illustrate the normal position of the secondary pointer which appears in full lines, dotted lines representing the deflection of the secondary pointer by the primary pointer.

The base is shown at 1 from which rises a tubular shell 2 containing the three springs 3, 4, 5 which successively take up the weights within their limits.

The indicating mechanism is contained within a shell 6 secured to the shell 2. The dial 7 is provided with concentric scales or graduations 8, 9, respectively. The number of pounds represented by the respective graduations 8, 9, will depend upon the strength of the springs 3, 4, 5. Similarly, the number of springs 3, 4, 5, and their tension or resistance to compression will vary according to the range of weights intended to be handled by the particular scale embodying my improvements.

As shown in Figs. 1 and 3, the graduations 8 run from zero to twenty pounds. The graduations represented on the scale 9 run from twenty to one hundred and twenty pounds. Subdivisions to represent fractions of a pound are provided.

The spring 5 is seated on base 1 and there extends through said spring a pillar 10 having a screw-threaded lower end 11 provided with a knurled adjusting head 12 by which the pillar may be turned to raise or lower it. Telescoping into the upper end of the spring 5 is the spring 4 which rests upon the pillar 10. The relationship of springs 4 and 5 is such that the spring 5 prevents spring 4 from buckling or flexing laterally and yet the spring 5 does not come into action until the spring 4 has been compressed down flush with the upper end of spring 5.

Surmounting the spring 4 is a platform 13 which has a hub projecting into the spring 4. The platform is provided with ball bearings 14 at its periphery which bear upon the inner face or wall of the shell 2, minimizing friction and assisting in preventing buckling of spring 4.

Spring 3 is seated in a cavity 15 in the upper face of the platform 13. Rising from the platform 13 is a spindle or hub 16 which extends through the spring 3 and prevents it from buckling.

Figure 2:
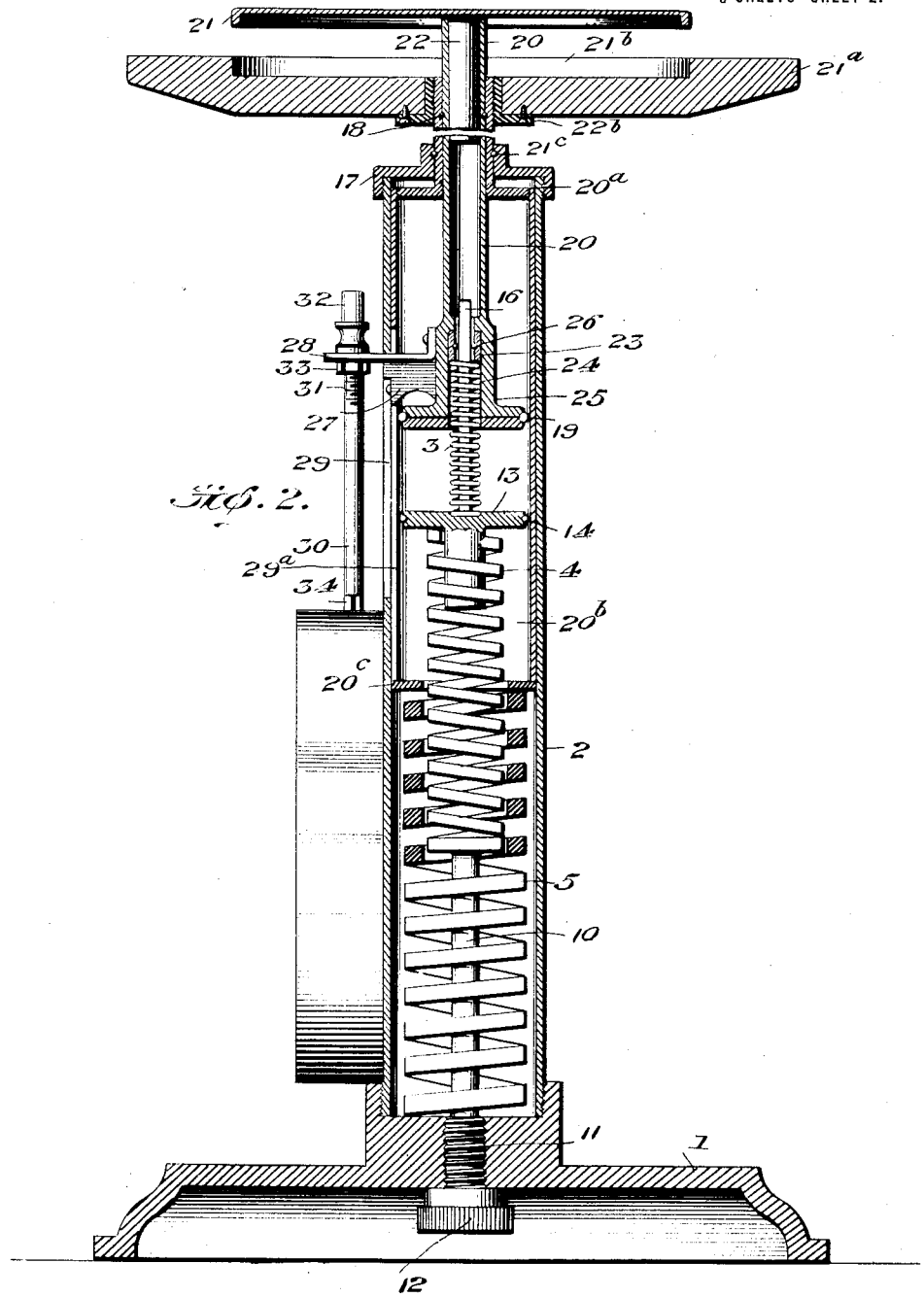
Fig. 2 is a vertical section, certain parts being in full lines.

Referring to the form of the invention shown in Figs. 1 and 2, there is slidable through a cap 17 at the upper end of the shell 2 and guided by ball bearings 18 and 19, a hollow stem 20 which supports the main scale pan or platform 21, the latter having a stud 22 loosely received in stem 20. A bushing 23 which is set into the hollow lower end 24 of the enlarged head 25 of the stem 20 serves as an abutment for the upper end of the spring 3 and is provided with ball bearings 26 bearing on the spindle 16. The upper end of the spring 3 being seated in the hollow part 24, said spring is prevented from buckling.

Projecting outwardly from the enlarged head 25 is a lug 27 which is provided with a bracket 28. The lug 27 is adapted to move in a slot 29 in the shell or column 2. A rod 30 has a screw-threaded upper end 31 which passes through the bracket 28 and is provided with a screw cap 32 by which it may be adjusted upwardly or downwardly in relation to the bracket 28. A lock nut 33 serves to clamp the rod in its adjusted position. The rod 30 has a squared portion 34 which slides between the ball bearings 35 in the bracket 36 secured to the shell 6. Thus the rod 30 is guided in its movements and is susceptible to such adjustment as may be found necessary for the purpose of bringing the pointers to zero (Fig. 3).

Referring to Fig. 2, this form of the invention includes a secondary pan or platform 21$^a$ which is provided with a concavity 21$^b$ to receive the pan 21. The platform or pan 21$^a$ has a collar and hollow bushing 22$^b$. Loosely mounted on stem 20 and slidable against ball bearings 21$^c$ is a hollow stem 20$^a$ on which the bushing 22$^b$ is secured.

The hollow secondary stem 20$^a$ has a head which is secured to the end of a tubular stem 20$^b$ which slidably telescopes within shell 2 and is supported on an annular plate 20$^c$ resting on spring 5.

The stem 20$^b$ has a slot 29$^a$ corresponding to, and registering with, slot 29 in which lug 27 slides. The balls 19 bear on the inner surface of stem 20$^b$.

In the form of the invention shown in Figs. 1 and 2, the platform 21 serves for the weighing of objects of light weight up to the limit of the capacity of spring 3 (spring 4 also supporting the weight) whereupon the platform 21 engages the platform 21$^a$ and the two platforms are then flush on top. Any weight supported by said platforms greater than the capacity of spring 3 is assumed by spring 4 up to the limit of capacity of said spring and then by spring 5.

In the form of the invention shown in Figs. 3 and 4, the hollow stem 20 and pan or platform 21 are used, but the platform 21$^a$ and parts supporting it from spring 4 are omitted. The principle of operation is, however, the same as that of the scale shown in Figs. 1 and 2.

The spring 3 sustains the weight supported by the pan 21 until the limit of compression of said spring is reached, whereupon the spring 4 assumes the weight, if the object is of such avoirdupois that it exceeds the capacity of the spring 3. Similarly when the capacity of the spring 4 is exceeded, the weight is assumed by the spring 5.

With this arrangement, whether two or more springs are employed, it is possible to weigh objects from an ounce or less up to a very large number of pounds and even into tons, with the employment of springs of proper tension and number.

The primary indicator, Figs. 1 and 3, is shown at 37 and is fast on an arbor 38 which is preferably provided with pivot ends to minimize friction and is mounted in the sides of a frame 39, Fig. 5. A spiral spring 40, which has one end secured to a bracket 41 carried by frame 39, is fastened to the arbor 38. The spring 40 prevents oscillation of the pointer 37 during operation of the scale because it suitably resists the movement of the pointer 37 and thus prevents any "lashing". A segmental gear 42 which is carried by an arbor 43 having pivot ends mounted in the members of the frame 39, is provided with an arc-shaped slot 44 which receives a pin or screw 45 carried by the rod 30. The rise or fall of the rod 30 causes the pin 45 to act on the walls of the slot 44 in a cam-like fashion to thereby turn the gear segment 42 on its pivot 43.

Secured to the arbor 38 is a pinion 46 with which the gear segment 42 meshes; consequently the pinion 46 is turned proportionately to the travel of the gear segment 42 in a ratio depending upon the teeth of the segment and the pinion and the effective radii thereof. I do not limit myself to any specific diameter of the pinion 46 or radius of the gear segment 42 or to the ratio of their radii, as these may be of different individual and relative radii. For instance by suitably increasing the diameter of the pinion and decreasing the radius of the gear segment, I can dispense with the secondary pointer 47 and use only one set of graduations on the dial, representing the full capacity of the scale. The turning of the arbor 38 moves the indicator 37 and thus the weight sustained by the spider or pan 21 is indicated. The travel of the pin 45 being in a path parallel to the travel of the part 34 of rod 30 insures accurate measurement regardless of the weight sustained and the extent of travel. A lip 39' arrests the gear segment 42 at the limit of its downward movement.

The indicator 37 is intended to register on the scale 8 up to one complete revolution, within the range of weights indicated by said scale. To enable the scale to register greater weights than indicated by the graduations 8, there is provided a secondary indicator 47 which is carried by a sleeve 48, Fig. 6, journaled on the arbor 38. A spiral spring 49, which has one end secured to the sleeve 48 at the point 50 has its other end fastened at 51 to a bracket 52 carried by the frame 39, said spring serving to return the indicator 47 to zero position where it is arrested by a stop 53, Figs. 1 and 3. The indicator 47 is preferably colored red or some other distinctive coloring to contrast it with the indicator 37. Indicator 47 registers on the scale 9 and is inactive until the indicator 37 has made a complete revolution, whereupon a pin 54 carried by the indicator 37 engages the indicator 47 and picks it up, carrying it along, as shown by dotted lines in Figs. 1 and 3. Subsequently the registration is on the scale 9.

When the weight is removed from the spider or pan 21 the expansion of the springs 3, 4, 5 returns the indicator 37, (and spring 49 returns indicator 47) to zero position. By adjusting the knurled head 12 and the screw cap 32 the scale may be reset.

In Fig. 7, I have illustrated how the invention may be embodied in a suspension scale having a hook 55 and a suspension clevis 56. The secondary indicator is shown at zero and the primary indicator in displaced position. The operation of the scale of Fig. 7 is the same as that of the scale of the preceding figures.

The dial 7 has a central opening for the inspection of the mechanism inside the shell 6 and this opening is normally closed by twin-semi-disks 57, 58 which are pivoted at 59. These semi-disks may be swung apart to afford access to the interior of the shell 6. They are shown closed in Figs. 1, 3 and 5.

What I claim is:

1. In a spring scale, the combination with a plurality of normally expanded, compressible springs of different load-capacities, of means for sustaining the object to be weighed, said springs being arranged so that the excess load will be assumed by a spring of greater capacity when said load exceeds the load of a lighter spring, and indicating means.

2. In a spring scale, the combination with a plurality of normally expanded, compressible springs of different load-capacities, of means for sustaining the object to be weighed, said springs being arranged so that the excess load will be assumed by a spring of greater capacity when said load exceeds the load of a lighter spring, means for adjusting certain ones of the springs in relation to each other to vary their relative action, and indicating means.

3. In a spring scale, the combination with a plurality of normally expanded, compressible coil springs of different load capacities, said springs being arranged so that the excess load will be assumed by a spring of greater capacity when said load exceeds the capacity of a lighter spring, means for sustaining the object to be weighed which cooperates with said springs in the order given, and indicating means.

4. In a spring scale the combination with a dial having graduations indicating weights, of primary and secondary pointers adapted to register on the graduations of said dial, said secondary pointer being free of the primary pointer until the primary pointer has moved a predetermined distance, load sustaining means having an operative connection with the primary pointer, and means whereby the primary pointer moves independently of the secondary pointer and only co-operates with the secondary pointer at a predetermined point of its travel to carry the said secondary pointer along with it.

5. In a spring scale the combination with a dial having a plurality of scales, one scale representing weights up to a given limit, the other scale representing weights continuing beyond said limit, a primary pointer adapted to register on the scale first named, a secondary pointer adapted to register on the last named scale, load sustaining means having an operative connection with the primary pointer, said primary pointer being normally free of the secondary pointer, there being provided means whereby the primary pointer will co-operate with the secondary pointer only after said primary pointer has registered the limit of weight on its scale, to thereby pick up and carry along with it the secondary pointer to cause the latter to register on its scale any weight greater than the limit of the primary scale.

6. In a spring scale, the combination with a dial, of independent primary and secondary pointers, independent springs for the respective pointers which independently return said pointers to normal position, said primary pointer being adapted to co-operate with and pick up the secondary pointer after said primary pointer has moved to a predetermined position, load sustaining means, and an operative connection between the load sustaining means and the primary pointer.

7. In a spring scale the combination with a dial, of an indicator adapted to register thereon, a pinion for turning the indicator, a gear segment meshing with the pinion, a rod support, a spring cooperating with the indicator to prevent "lashing" thereof and an operating bar co-operating with the gear segment to transfer the movement of the load support thereto.

8. In a spring scale the combination with a dial, of an indicator adapted to register thereon, a pinion for turning the indicator, a gear segment meshing with the pinion, said segment having a cam surface, a load support, a spring cooperating with the indicator to prevent "lashing" thereof and an operating bar having a pin engaging the cam surface, said bar being adapted to transfer the movement of the load support to the gear segment.

9. In a spring scale, the combination with a plurality of springs of different capacities, of independent primary and secondary pans or platforms respectively sustained by springs of different capacities, one pan or platform being adapted to sustain the object to be weighed up to the limit of a spring of lesser capacity and then, by its position, to transfer the weight of the object to the other pan or platform, if the object is sufficiently heavy, said latter platform successively co-operating with the spring or springs of greater capacity, and indicating means.

10. In a spring scale, the combination with a dial, of a pivoted indicator adapted to register thereon, a load support, a plurality of normally expanded, compressible springs of different load capacities arranged so that the excess load will be assumed by a spring of greater capacity when said load exceeds the capacity of a lighter spring, an operative connection between the load support and the indicator, and a spring cooperating with the indicator to prevent "lashing" thereof.

In testimony whereof I affix my signature.

THOMAS FRANCIS HICKEY.